No. 714,914. Patented Dec. 2, 1902.
N. S. KEITH.
PROCESS OF OBTAINING METALS FROM THEIR ORES.
(Application filed July 25, 1902.)
(No Model.)
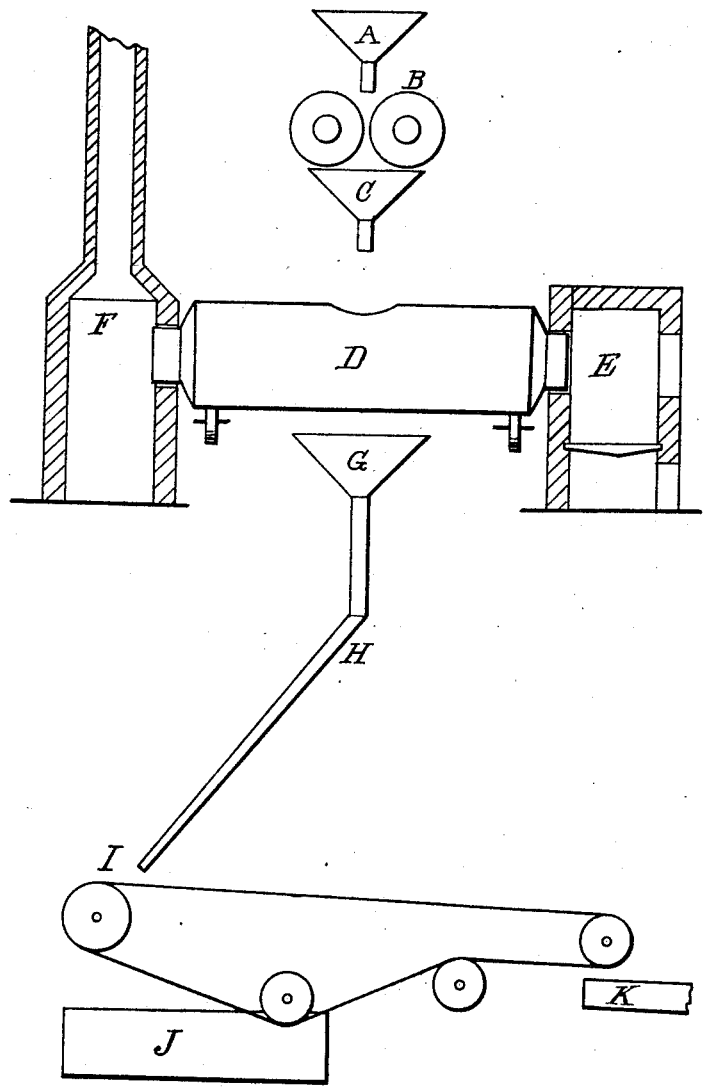
WITNESSES:
Ralph W. Pope,
Amy Stoughton Pope
INVENTOR:
Nathaniel Shepard Keith.

UNITED STATES PATENT OFFICE.

NATHANIEL SHEPARD KEITH, OF ARLINGTON, NEW JERSEY.

PROCESS OF OBTAINING METALS FROM THEIR ORES.

SPECIFICATION forming part of Letters Patent No. 714,914, dated December 2, 1902.

Application filed July 25, 1902. Serial No. 117,018. (No specimens.)

*To all whom it may concern:*

Be it known that I, NATHANIEL SHEPARD KEITH, a citizen of the United States of America, residing at Arlington, county of Hudson, State of New Jersey, have invented new and useful Improvements in Obtaining Metals from their Ores and Gangues, of which the following is a specification.

One object of my invention is to so prepare the ores of metals associated with their gangues that the metals may be separated from their gangues by concentration more effectively and cheaply. I attain this object by grinding the ores and their gangues to the necessary degree of fineness, and after mixing the ground materials with comminuted carbon—such as ground coal, ground charcoal, or petroleum—I heat them in a suitable furnace to the degree of fusion of the particles of ores, or I prefer to grind the carbon with the ores and their gangues, thus forming the mixture by the one operation.

The full object of obtaining the metals effectively is attained by separating the resulting changed metallic substances from the gangues by any suitable method of concentration known in the art of metallurgy.

The accompanying drawing is diagrammatic only, because its several parts serve only to illustrate an assemblage of mechanisms known in the art by the use of which my invention may be operated.

When ores suitably divided are heated to about their fusion-point in contact with carbon or carbon monoxid, (CO,) they undergo various changes—such as parting with their oxygen, chlorin, carbonic acid, and part or all of their sulfur, and the reduction to the metallic state of their metals, the particles of which last assume a more or less globular shape. This state will occur at a temperature somewhat lower than the temperature at which a fluid state of the metal would be reached when fluxes are used. This globular shape is also taken on by such particles as have not lost their entire amount of sulfur. In this globular shape they have a greater specific gravity than did the particles of original ores. For that reason and the further one that they have not the previous irregular ragged shapes they are more readily and effectively separated from the gangues by concentration.

Take, for illustration, comminuted copper ores consisting of oxids, chlorids, carbonates, and cuprous sulfids ($Cu_2S$) and their gangues, such as silica, lime, &c. When heated to the proper degree with carbon or in an atmosphere of carbon monoxid, (CO,) the particles of copper ores are reduced to spherical shapes of metallic copper, resembling shot. If the ores are chalcopyrite, (sulfids of copper and iron,) then part of the sulfur will be retained and the reduced material will be globular forms of subsulfid of copper and iron, which are magnetic.

In operating my invention I mix a suitable quantity of carbon, such as coal, with the ores associated with their gangues and grind the mixture by the use of suitable grinders—as, for instance, the rolls B in the drawing. I may grind them to the fineness to pass through a sieve of No. 30 mesh or even finer or it may be to the degree at which they will pass through a No. 4 mesh sieve or coarser, the requisite being that the ores may be freed as far as practicable from the gangue while as coarse as will satisfy that condition and the further condition that they may come in continued contact while heated with the carbon and carbon monoxid.

A and C in the drawing represent hoppers or other receptacles for receiving the materials, A to receive the coarse ore mixture as received from the mines or previous crushing apparatus, together with the carbon for feeding to the rolls, and C to receive the mixture of ground ores, gangues, and carbon from the rolls and feed it in suitably-sized quantities to the furnace-drum D.

In the drawing, D, E, and F represent, respectively, the drum, fireplace, and chimney of a type of furnace known in the art as the "Bruckner."

A charge of the mixture in the drum D is heated by fire in the fireplace E until the carbon in the mixture is ignited, when it will continue to burn with little or no additional fuel in the fireplace until the heat has become great enough to fuse the particles of ores.

The drum is slowly rotated meantime, so that the contents continually expose renewed surfaces to the gases in the furnace to allow the access of oxygen to the carbon, sulfid of carbon, ($CS_2$,) and carbon monoxid, (CO,) which are products of partial oxidation for their further combustion or oxidation, thus adding to the temperature of the furnace and the mass of material therein; but this combustion must not be complete at or near the end of the heating, for enough carbon must remain incompletely oxidized to insure an atmosphere of substantially carbon monoxid (CO) permeating the materials to prevent oxidation of the metals.

The amount of carbon requisite to be mixed with the ores and gangues must be enough to furnish sufficient carbon monoxid to keep an atmosphere of it in the drum under the various reactions which take place in the reduction of the ores to the metallic state and also have the heat of combustion sufficient to fuse the particles of ores. Five per cent. of the mixture may be of carbon or even more. An excess does no harm, except in unnecessary cost of carbon.

When the operation is complete in the drum D, the contents are discharged into the hopper or other receptacle, (represented at G,) and the drum is again filled, as before.

H represents a pipe or other conveyer from the receptacle G, by which the prepared mixture is passed to the belt I of a Frue vanner or to the table of any other suitable concentrator.

J represents a box into which the concentrates are washed, and so saved, and K represents the launder through which the tailings are discharged.

What I claim as my invention, and desire to secure by Letters Patent, is—

1. The process of separating a metal from its ore and gangue; which consists in grinding the ore and gangue with carbon; heating the ground mixture in an open furnace, containing an atmosphere of reducing gases, to the temperature of the fusion of the particles of ore only; and then submitting the thus-treated mixture to mechanical concentration to obtain the metal.

2. The process of separating a metal from its ore and gangue; which consists in grinding the ore and gangue with carbon; heating the comminuted mixture to the temperature of fusion of the ore only; and then separating the metal from the thus-treated mixture by mechanical concentration.

3. The process of separating a metal from its ore and gangue; which consists in mixing the ore and gangue in a comminuted state with comminuted carbon; heating the mixture in an open furnace, containing an atmosphere of reducing gases, to the temperature of fusion of the particles of ore only; and then separating the metal from the thus-treated mixture by mechanical concentration.

4. The process of preparing an ore and its gangue for the separation of their metals by concentration; which consists in mixing the ore and gangue in a comminuted state with comminuted carbon; and heating the mixture in an open furnace containing an atmosphere of reducing gases, at the temperature of fusion of the particles of ore only.

5. The process of preparing an ore and its gangue for the separation of their metals by concentration; which consists in submitting a comminuted mixture of the ore, its gangue and carbon to heat obtained from combustion of the carbon, in an open furnace, and in an atmosphere of reducing gases, at the temperature of fusion of the ores only.

6. The process of preparing an ore and its gangue for the separation of their metals by concentration; which consists in heating a comminuted mixture of the ore, its gangue and carbon to the temperature of fusion of the ore only.

In testimony whereof I have signed my name to this specification, in the presence of two subscribing witnesses, this 21st day of July, 1902.

NATHANIEL SHEPARD KEITH.

Witnesses:
RALPH W. POPE,
AMY STOUGHTON POPE.